United States Patent
Son et al.

(10) Patent No.: US 9,266,510 B2
(45) Date of Patent: Feb. 23, 2016

(54) MASTER CYLINDER FOR BRAKE SYSTEM

(71) Applicant: MANDO CORPORATION, Pyeongtaek-Si (KR)

(72) Inventors: Young Jun Son, Pyeongtaek-si (KR); Yu Don Jung, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 332 days.

(21) Appl. No.: 13/873,139

(22) Filed: Apr. 29, 2013

(65) Prior Publication Data

US 2013/0283780 A1    Oct. 31, 2013

(30) Foreign Application Priority Data

Apr. 30, 2012    (KR) .................. 10-2012-0045205

(51) Int. Cl.
*B60T 11/224*    (2006.01)

(52) U.S. Cl.
CPC .................... *B60T 11/224* (2013.01)

(58) Field of Classification Search
CPC .............................. B60T 11/224; B60T 13/12
USPC ............................................ 60/562, 574, 593
See application file for complete search history.

(56) References Cited

U.S. PATENT DOCUMENTS

| | | | | |
|---|---|---|---|---|
| 3,889,469 A | * | 6/1975 | Cryder et al. ................... | 60/562 |
| 4,373,333 A | * | 2/1983 | Coleman ......................... | 60/578 |
| 4,499,729 A | | 2/1985 | Gaiser | |
| 4,667,466 A | * | 5/1987 | Mizusaki ........................ | 60/578 |
| 5,018,353 A | * | 5/1991 | Pugh ............................... | 60/562 |
| 5,720,170 A | * | 2/1998 | Hageman et al. ............... | 60/562 |

(Continued)

FOREIGN PATENT DOCUMENTS

| | | |
|---|---|---|
| DE | 40 30 613 | 5/1991 |
| DE | 10 2006 013 626 | 10/2006 |

(Continued)

OTHER PUBLICATIONS

Office Action dated Jul. 3, 2014 for corresponding German Patent Application No. 10 2013 007 832.6, and its English Summary provided by the Applicant's foreign counsel.

(Continued)

*Primary Examiner* — Thomas E Lazo
(74) *Attorney, Agent, or Firm* — Ladas & Parry, LLP

(57) ABSTRACT

Disclosed is a master cylinder for brake systems including a cylinder body having a bore therein, a first and second piston installed in the bore to move forward and backward, and a first hydraulic pressure chamber and a second hydraulic pressure chamber, the first and second hydraulic pressure chambers being divided from each other in the bore. The master cylinder further includes a pressure regulating channel to connect the first hydraulic pressure chamber to second hydraulic pressure chamber to reduce pressure difference between the first hydraulic pressure chamber and the second hydraulic pressure chamber, and a flow control valve provided in the pressure regulating channel to open and close the pressure regulating channel according to the pressure difference between the first hydraulic pressure chamber and the second hydraulic pressure chamber. The first hydraulic pressure chamber is provided with a large hydraulic pressure chamber expanded to an inside of the cylinder body, and a small hydraulic pressure chamber smaller than the large hydraulic pressure chamber.

10 Claims, 2 Drawing Sheets

(56) References Cited

U.S. PATENT DOCUMENTS 5,916,141 A * 6/1999 Kim .............................. 60/562
6,014,862 A * 1/2000 Shaw et al. .................... 60/533

FOREIGN PATENT DOCUMENTS

| KR | 10-0131024 | 4/1998 |
| KR | 10-2008-0086651 A | 9/2008 |
| WO | 2011/120962 | 10/2011 |

OTHER PUBLICATIONS

Office Action dated Feb. 14, 2014 for corresponding Korean Patent Application No. 10-2012-0045205, and its English Summary.
Office Action dated Dec. 3, 2014 for Chinese Patent Application No. 201310154253.X, and its English Summary provided by the Applicant's foreign counsel.

* cited by examiner

MASTER CYLINDER FOR BRAKE SYSTEM

CROSS-REFERENCE TO RELATED APPLICATION

This application claims priority to Korean Patent Application No. 10-2012-0045205, filed on Apr. 30, 2012 in the Korean Intellectual Property Office, the disclosure of which is incorporated herein by reference in its entirety.

BACKGROUND

1. Field

Embodiments of the present invention relate to a master cylinder for brake systems which may improve brake feel.

2. Description of the Related Art

In a hydraulic brake system for vehicles, a master cylinder serves to generate hydraulic pressure and transfer the generated hydraulic pressure to a caliper brake installed at each wheel.

FIG. 1 shows a general tandem master cylinder. The master cylinder includes a first piston 3 and a second piston 4 installed in a bore 2 of a cylinder body 1 to be movable back and forth. The inside of the bore 2 is divided into a first hydraulic pressure chamber 5 and a second hydraulic pressure chamber 6 by the second piston 4. When the first piston 3 of the master cylinder moves forward, the first piston 3 applies pressure to the oil in the first hydraulic pressure chamber 5, and in turn the oil pressure in the first hydraulic pressure chamber 5 presses the second piston 4. Then, the second piston 4 applies pressure to the oil in the second hydraulic pressure chamber 6. Thereby, the oil in the first hydraulic pressure chamber 5 is supplied to the caliper brakes (not shown) of two wheels via a first oil discharge hole 7, and the oil in the second hydraulic pressure chamber 6 is supplied to the caliper brakes of the other two wheels via a second oil discharge hole 8.

The master cylinder is used for an F/R (front/rear) split-type vehicle or X-split (cross split)-type vehicle according to the brand or type of the vehicle. Here, the F/R-type split vehicle refers to a vehicle that controls hydraulic pressure supplied to the front wheels or the rear wheels, and the X-split-type vehicle refers to a vehicle which controls one of the front left wheel and the front right wheel and one of the rear left wheel and the rear right wheel. That is, the X-split-type vehicle controls the wheels in a cross manner that pairs one of the front wheels on one side with one of the rear wheels on the other side. The X-split type control is recently applied to a majority of vehicles since it allows one of the hydraulic chambers to produce braking pressure when the other hydraulic chamber malfunctions during braking operation, thereby securing driver safety.

Meanwhile, the caliper brake installed at each wheel serves to perform braking operation by pressing a disc rotating together with the wheel. However, if the caliper brake is arranged to increase the amount of rollback to reduce drag of the caliper which occurs during braking, an excessively large amount of hydraulic oil may be needed at the initial stage of braking, resulting in degradation of initial brake feel.

A structure to increase an initial flow rate, i.e., a structure to increase an initial flow rate in the first hydraulic pressure chamber, has been proposed to address the problems described above. However, this structure may cause pressure difference between the two hydraulic pressure chambers, resulting in difference in braking force among the wheels. Therefore, it may not be used for the X-split vehicle.

SUMMARY

Therefore, it is an aspect of the present invention to provide a master cylinder of a brake system which may increase initial flow rate to enhance brake feel and may minimize the pressure difference between a first hydraulic pressure chamber and a second hydraulic pressure chamber to be applicable to an X-split type vehicle.

Additional aspects of the invention will be set forth in part in the description which follows and, in part, will be obvious from the description, or may be learned from practice of the invention.

In accordance with one aspect of the present invention, a master cylinder for brake systems including a cylinder body having a bore therein, a first and second piston installed in the bore to move forward and backward, and a first hydraulic pressure chamber and a second hydraulic pressure chamber adapted to be pressed respectively by the first and second pistons, the first and second hydraulic pressure chambers being divided from each other in the bore, may further include a pressure regulating channel to connect the first hydraulic pressure chamber to the second hydraulic pressure chamber to reduce pressure difference between the first hydraulic pressure chamber and the second hydraulic pressure chamber, and a flow control valve provided in the pressure regulating channel to open and close the pressure regulating channel according to the pressure difference between the first hydraulic pressure chamber and the second hydraulic pressure chamber, wherein the first hydraulic pressure chamber may be provided with a large hydraulic pressure chamber expanded to an inside of the cylinder body, and a small hydraulic pressure chamber smaller than the large hydraulic pressure chamber, and the cylinder body may be provided with a first oil introduction port to supply oil to the first hydraulic pressure chamber and a second oil introduction port to supply oil to the second hydraulic pressure chamber, wherein each of the first and second oil introduction ports may be provided with a check valve, wherein the check valve of the first oil introduction port may be closed at an initial stage of braking, and opened after a predetermined portion of hydraulic pressure in the large hydraulic pressure chamber is discharged.

The first piston may be provided with a first step portion extending a distance corresponding to a length of the large hydraulic pressure chamber to apply pressure to the large hydraulic pressure chamber, and a second step portion formed to apply pressure to the small hydraulic pressure chamber.

The pressure regulating channel may be formed in the cylinder body.

The pressure regulating channel may be formed by drilling through the cylinder body, and the opening made by drilling is closed by a covering member.

The pressure regulating channel may allow the large hydraulic pressure chamber of the first hydraulic pressure chamber and the second hydraulic pressure chamber to communicate with each other therethrough.

The flow control valve may be one of a normally-open type solenoid valve and a normally-closed type solenoid valve having a function of the check valve to control flow through the pressure regulating channel and prevent backflow of hydraulic pressure from the second hydraulic pressure chamber to the first hydraulic pressure chamber.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
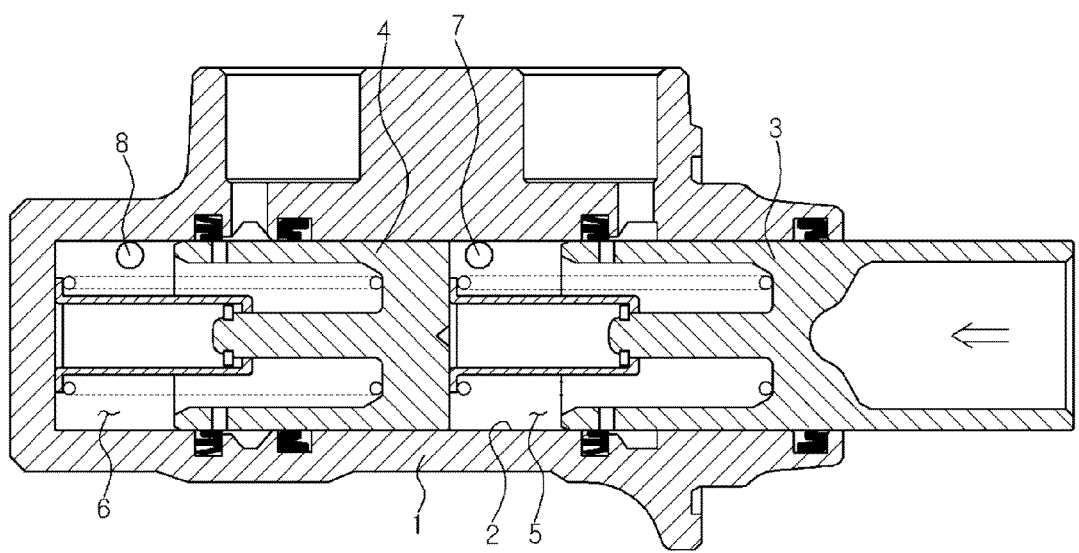
FIG. 1 is a cross-sectional view illustrating a conventional master cylinder for brake systems.

Reference will now be made in detail to the embodiments of the present invention, examples of which are illustrated in the accompanying drawings, wherein like reference numerals refer to like elements throughout. The terms used in the following description are defined taking into consideration the functions obtained in accordance with the embodiments, and the definitions of these terms should be determined based on the overall content of this specification. Therefore, the configurations disclosed in the embodiments and the drawings of the present invention are only exemplary and do not encompass the full technical spirit of the invention, and thus it will be appreciated that the embodiments may be variously modified and changed.

Figure 2:
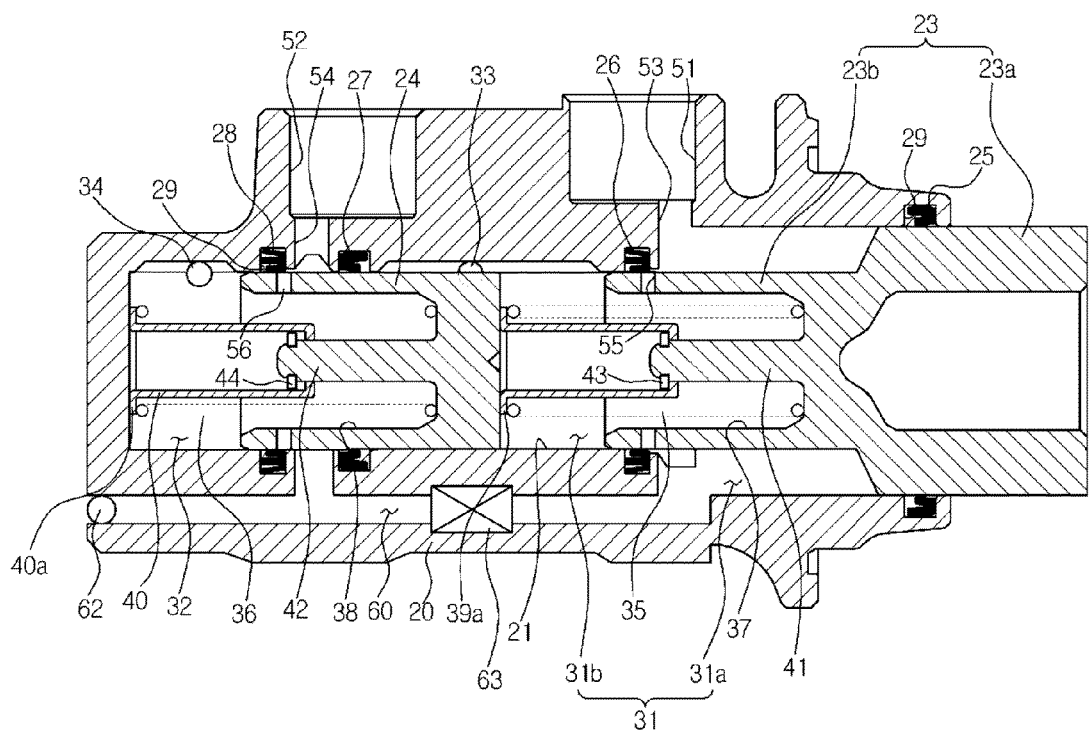
FIG. 2 is a cross-sectional view illustrating a master cylinder for brake systems according to an embodiment of the present invention.

As shown in FIG. 2, the master cylinder for brake systems according to the illustrated embodiment includes a cylinder body 20 having a bore 21 formed therein, and a first piston 23 and a second piston 24 installed in the bore 21 of the cylinder body 20 to be movable forward and backward.

First and second sealing members 25 and 26 are installed between the inner surface of the bore 21 and the outer surface of the first piston 23, and third and fourth sealing members 27 and 28 are installed between the inner surface of the bore 21 and the outer surface of the second piston 24. The sealing members 25, 26, 27 and 28 are respectively accommodated in support grooves 29 formed in the inner surface of the bore 21 such that they are not moved when the pistons 23 and 24 move back and forth. Accordingly, the inner space of the bore 21 is divided into a first hydraulic pressure chamber 31 defined between the first piston 23 and the second piston 24, and a second hydraulic pressure chamber 32 defined between the second piston 24 and the end inner surface of the bore 21.

The first hydraulic pressure chamber 31 is formed in a stepped shape to have a small diameter portion and a large diameter portion. For example, the first hydraulic pressure chamber 31 is provided with a large hydraulic pressure chamber 31a expanded to the inside of the cylinder body 20 and a small hydraulic pressure chamber 31b smaller than the large hydraulic pressure chamber 31a. Thereby, the first piston 23 to apply pressure to the large hydraulic pressure chamber 31a has cross-sectional areas having shapes corresponding to the large hydraulic pressure chamber 31a and the small hydraulic pressure chamber 31b. That is, the first piston 23 is provided with a first step portion 23a extending a distance corresponding to the length of the large hydraulic pressure chamber 31a to apply pressure to the large hydraulic pressure chamber 31a and a second step portion 23b to apply pressure to the small hydraulic pressure chamber 31b. Operation of the first hydraulic pressure chamber 31 and the first piston 23 will be described later.

To allow the oil in the first and second hydraulic pressure chambers 31 and 32 to be discharged when pressure is applied to the first and second hydraulic pressure chambers 31 and 32 by the first and second pistons 23 and 24, the cylinder body 20 is provided with a first oil discharge hole 33 formed to the side of the first hydraulic pressure chamber 31, a second oil discharge hole 34 formed to the side of the second hydraulic pressure chamber 32. Accordingly, when the first piston 23 moves forward, the first piston 23 applies pressure to the first hydraulic pressure chamber 31, and the second piston 24 is pressed by the pressure from the first hydraulic pressure chamber 31 to apply pressure to the second hydraulic pressure chamber 32. Then, the oil in the first and second hydraulic pressure chambers 31 and 32 is discharged through the first and second oil discharge holes 33 and 34 and supplied to the caliper brakes (not shown) on the respective wheels.

A first restoring spring 35 is installed in the first hydraulic pressure chamber 31 to return the first piston 23 when braking is terminated, and a second restoring spring 36 to return the second piston 24 is installed in the second hydraulic pressure chamber 32. In addition, spring accommodation grooves 37 and 38 are respectively formed at the fronts of the first and second pistons 23 and 24 to allow the first and second restoring springs 35 and 35 to respectively move thereinto. Further, a first support 41 and a second support 42 respectively extending forward in a rod shape from the inside of the spring accommodation grooves 37 and 38 in the first and second pistons 23 and 24 are provided to allow first and second retainers 39 and 40 respectively supporting the restoring springs 35 and 36 to be installed thereon. Snap rings 43 and 44 are respectively installed at the first and second supports 41 and 42 to prevent separation of the first and second retainers 39 and 40 from the first and second supports 41 and 42. That is, one end of each of the first and second restoring springs 35 and 36 is supported at the inside of a corresponding one of the spring accommodation grooves 37 and 38, and the other end thereof is supported at a corresponding one of the flange-shaped ends 39a and 40a of the first and second retainers 39 and 40. The first and second retainers 39 and 40 are fitted onto the outer surfaces of the first and second supports 41 and 42 to be movable forward and backward, and separation thereof is prevented by the snap rings 43 and 44 coupled to the first and second supports 41 and 42.

First and second oil introduction ports 51 and 52 connected to the oil tank (not shown) are provided at the upper portion of the cylinder body 20, and respectively communicate with the first and second hydraulic pressure chambers 31 and 32 through the first and second oil introduction inlets 53 and 54. For this configuration, the first oil introduction inlet 53 is formed between the first sealing member 25 and the second sealing member 26, while the second oil introduction inlet 54 is formed between the third sealing member 27 and the fourth sealing member 28. In addition, the communication holes 55 and 56 allowing the spring accommodation grooves 37 and 38 to communicate with the outer surfaces thereof are formed in the first and second pistons 23 and 24 such that the oil introduced through the first and second oil introduction inlets 53 and 54 may flow into the first and second hydraulic pressure chambers 31 and 32. This configuration is intended to allow the oil to be supplied to the first and second hydraulic pressure chambers 31 and 32 when the communication holes 55 and 56 are positioned between the first and second sealing members 25 and 26 or between the third and fourth sealing members 27 and 28 according to backward movement of the first and second pistons 23 and 24.

The communication holes 55 and 56 are arranged at the lower or rear portions of the second and fourth sealing members 26 and 28 to allow the first and second oil introduction inlets 53 and 54 to respectively communicate with the first and second hydraulic pressure chambers 31 and 32 once the first and second pistons 21 and 22 are moved backward. In this configuration, the oil is allowed to flow through the communication holes 55 and 56 when the first and second pistons 23 and 24 are moved backward, while flow of the oil through the communication holes 55 and 56 is blocked when the first and second pistons 23 and 24 are moved forward and thereby the communication holes 23 and 24 are caused to be displaced from the positions of the second and fourth sealing members 26 and 28 and moved forward. Therefore, when the first and second pistons 23 and 24 are moved backward, oil may be replenished in the first and second hydraulic pressure chambers 31 and 32. When the first and second pistons 23 and 24 are moved forward, pressure may be applied to the first and second hydraulic pressure chambers 31 and 32 by the first and second pistons 23 and 24.

The first and second oil introduction ports 51 and 52 may be respectively provided with first and second check valves (not shown). The check valve arranged at the first oil introduction port 51, which is closed at the initial stage of braking, is opened after a predetermined portion of the hydraulic pressure in the large hydraulic pressure chamber 31a is discharged. Operation of the check valves will be described later.

According to the illustrated embodiment, the cylinder body 20 is provided with a pressure regulating channel 60 to reduce pressure difference between the first hydraulic pressure chamber 31 and the second hydraulic pressure chamber 32. As show in FIG. 2, the pressure regulating channel 60 is adapted to connect the large hydraulic pressure chamber 31a of the first hydraulic pressure chamber 31 with the second hydraulic pressure chamber 32. This configuration allows the pressure of the large hydraulic pressure chamber 31a to be transferred to the second hydraulic pressure chamber 32 through the pressure regulating channel 60 when the first hydraulic pressure chamber 31 is pressed by the first piston 23, i.e., when pressure is applied to the large hydraulic pressure chamber 31a by a first step portion 23a of the first piston 23, thereby reducing the pressure difference between the first hydraulic pressure chamber 31 and the second hydraulic pressure chamber 32. In addition, as the hydraulic pressure, i.e., the oil is supplied from the large hydraulic pressure chamber 31a to the second hydraulic pressure chamber 32, the flow rate of the oil is increased through the first and second hydraulic pressure chambers 31 and 32 at the initial stage of braking, and thereby brake feel may be improved.

The pressure regulating channel 60 may be formed by drilling through the cylinder body 20, and the opening made by drilling is closed by a covering member 62. Referring to FIG. 2, the covering member 62 is made of a rubber material and formed in a ball shape. Embodiments of the present invention are not limited thereto. Any shape and any material may be used if it is suitable to close the pressure regulating channel 60 formed by machining.

Meanwhile, a flow control valve 63 to open and close the pressure regulating channel 60 is provided in the pressure regulating channel 60 to control flow through the pressure regulating channel 60. Thereby, the hydraulic pressure transferred from the first hydraulic pressure chamber 31 to the second hydraulic pressure chamber 32 is controlled to reduce pressure difference between the first hydraulic pressure chamber 31 and the second hydraulic pressure chamber 32 by opening and closing the pressure regulating channel 60 according to the pressure difference between the two hydraulic pressure chambers 31 and 32. As the flow control valve 63, a check valve may be used to prevent backflow of the oil from the second hydraulic pressure chamber 32 to the first hydraulic pressure chamber 31. Alternatively, a normally-open type or normally-closed type solenoid valve having the function of the check valve may be used as the flow control valve 63 to control flow through the pressure regulating channel 60. When the normally-open type or normally-closed type solenoid valve is used, it may be controlled to prevent continuous flow of oil from the first hydraulic pressure chamber 31 to the second hydraulic pressure chamber 32. Thereby, when oil leakage occurs in one of the first and second hydraulic pressure chambers 31 and 32, braking pressure may be created in the other hydraulic pressure chamber.

In the embodiment of FIG. 2, the pressure regulating channel 60 is formed in the cylinder body 20. However, embodiments of the present invention are not limited thereto. The pressure regulating channel 60 may alternatively be realized by installing a separate pipe on the cylinder body 20.

Hereinafter, overall operation of the master cylinder for brake systems will be described.

In braking operation, braking is not effected from the moment foot force is applied to the brake pedal 10, but begins after the brake pedal 10 travels a certain distance forward. The distance that the brake pedal 10 travels from the moment the brake pedal 10 begins to be depressed to when braking begins is referred to as a lost travel section (hereinafter, "LT section"). A driver feels that brake feel is good when the LT section is short. That is, when the LT section is shortened by increasing the initial flow rate, brake feel is improved.

Accordingly, when the piston 23 is pressed by the initial braking operation with the master cylinder and thereby pressure is applied to the large hydraulic pressure chamber 31a by the first step portion 23a of the piston 23, the pressure causes the oil in the large hydraulic pressure chamber 31a to be supplied to the small hydraulic pressure chamber 31b through the communication hole 55 and then to the caliper brake (not shown) through the first oil discharge hole 33. In addition, the hydraulic pressure of the large hydraulic pressure chamber 31a is supplied to the second hydraulic pressure chamber 32 through the pressure regulating channel 60, and then to the caliper brake through the second oil discharge hole 34 in the second hydraulic pressure chamber 32. As the hydraulic pressure in the large hydraulic pressure chamber 31a is supplied to the caliper brake connected to the first and second hydraulic pressure chamber 31 and 32 at the initial stage of braking, the hydraulic braking pressure is increased at the initial stage of braking to shorten the LT section, and thereby brake feel may be improved.

At this time, the check valve (not shown) formed at the first oil introduction port 51 is closed, while the flow control valve 63 is opened.

Subsequently, when the first piston 23 moves a predetermined distance beyond the LT section, i.e., when the communication hole 55 formed in the second step portion 23b moves past the second sealing member 26, the master cylinder performs its original function. That is, as the check valve formed at the first oil introduction port 51 is opened to receive oil supplied from the oil tank (not shown), the first piston 23 moves forward to apply pressure to the small hydraulic pressure chamber 31b of the first hydraulic pressure chamber 31. When pressure is applied to the first hydraulic pressure chamber 31, the second piston 24 is moved forward by the pressure, and thereby the second hydraulic pressure chamber 32 is pressed. Accordingly, the oil in the first and second hydraulic pressure chamber 31 and 32 is supplied to the caliper brakes (not shown) at the respective wheels through the first and second oil discharge holes 33 and 34, allowing braking to be performed.

If pressure difference between the first hydraulic pressure chamber 31 and the second hydraulic pressure chamber 32 occurs during braking, the pressure difference triggers operation of the flow control valve 63 in the pressure regulating channel 60 to obtain pressure balance between the two hydraulic pressure chambers 31 and 32, and thus the pressure difference between the two hydraulic pressure chambers 31 and 32 may be minimized.

When braking is released, the first and second pistons 23 and 24 are pushed back by the elasticity of the first restoring spring 35 and the second restoring spring 36, and thereby the first and second pistons 23 and 24 return to the original states thereof.

As is apparent from the above description, a master cylinder for brake systems according to the embodiment of the present invention may increase initial flow rate, thereby improving brake feel. In addition, the master cylinder may be applied to an X-split type vehicle with pressure difference between the first and second hydraulic pressure chambers minimized.

In addition, a pressure regulating channel is selectively opened and closed using a flow control valve provided therein. Therefore, when oil leakage occurs in one of the first and second hydraulic pressure chambers, braking pressure may be created in the other hydraulic pressure chamber.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A master cylinder for brake systems including a cylinder body having a bore therein, a first and second piston installed in the bore to move forward and backward, and a first hydraulic pressure chamber and a second hydraulic pressure chamber adapted to be pressed respectively by the first and second pistons, the first and second hydraulic pressure chambers being divided from each other in the bore, the master cylinder comprising:
    a pressure regulating channel to connect the first hydraulic pressure chamber to the second hydraulic pressure chamber to reduce pressure difference between the first hydraulic pressure chamber and the second hydraulic pressure chamber, and a flow control valve provided in the pressure regulating channel to open and close the pressure regulating channel according to the pressure difference between the first hydraulic pressure chamber and the second hydraulic pressure chamber,
    wherein:
    the first hydraulic pressure chamber is provided with a large hydraulic pressure chamber expanded to an inside of the cylinder body, and a small hydraulic pressure chamber smaller than the large hydraulic pressure chamber; and
    the cylinder body is provided with a first oil introduction port to supply oil to the first hydraulic pressure chamber and a second oil introduction port to supply oil to the second hydraulic pressure chamber,
    wherein each of the first and second oil introduction ports is provided with a check valve,
    wherein the check valve of the first oil introduction port is closed at an initial stage of braking, and opened after a predetermined portion of hydraulic pressure in the large hydraulic pressure chamber is discharged, and
    wherein the pressure regulating channel allows the large hydraulic pressure chamber of the first hydraulic pressure chamber and the second hydraulic pressure chamber to communicate with each other therethrough.

2. The master cylinder according to claim 1, wherein the first piston is provided with a first step portion extending a distance corresponding to a length of the large hydraulic pressure chamber to apply pressure to the large hydraulic pressure chamber, and a second step portion formed to apply pressure to the small hydraulic pressure chamber.

3. The master cylinder according to claim 1, wherein the pressure regulating channel is formed in the cylinder body.

4. The master cylinder according to claim 3, wherein the pressure regulating channel is formed by drilling through the cylinder body, and the opening made by drilling is closed by a covering member.

5. The master cylinder according to claim 1, wherein the flow control valve is one of a normally-open type solenoid valve and a normally-closed type solenoid valve having a function of the check valve to control flow through the pressure regulating channel and prevent backflow of hydraulic pressure from the second hydraulic pressure chamber to the first hydraulic pressure chamber.

6. A master cylinder for brake systems including a cylinder body having a bore therein, a first and second piston installed in the bore to move forward and backward, and a first hydraulic pressure chamber and a second hydraulic pressure chamber adapted to be pressed respectively by the first and second pistons, the first and second hydraulic pressure chambers being divided from each other in the bore, the master cylinder comprising:
    a pressure regulating channel to connect the first hydraulic pressure chamber to the second hydraulic pressure chamber to reduce pressure difference between the first hydraulic pressure chamber and the second hydraulic pressure chamber, and a flow control valve provided in the pressure regulating channel to open and close the pressure regulating channel according to the pressure difference between the first hydraulic pressure chamber and the second hydraulic pressure chamber,
    wherein:
    the first hydraulic pressure chamber is provided with a large hydraulic pressure chamber expanded to an inside of the cylinder body, and a small hydraulic pressure chamber smaller than the large hydraulic pressure chamber; and
    the cylinder body is provided with a first oil introduction port to supply oil to the first hydraulic pressure chamber and a second oil introduction port to supply oil to the second hydraulic pressure chamber,
    wherein each of the first and second oil introduction ports is provided with a check valve,
    wherein the check valve of the first oil introduction port is closed at an initial stage of braking, and opened after a predetermined portion of hydraulic pressure in the large hydraulic pressure chamber is discharged, and
    wherein the flow control valve is one of a normally-open type solenoid valve and a normally-closed type solenoid valve having a function of the check valve to control flow through the pressure regulating channel and prevent backflow of hydraulic pressure from the second hydraulic pressure chamber to the first hydraulic pressure chamber.

7. The master cylinder according to claim 6, wherein the first piston is provided with a first step portion extending a distance corresponding to a length of the large hydraulic pressure chamber to apply pressure to the large hydraulic pressure chamber, and a second step portion formed to apply pressure to the small hydraulic pressure chamber.

8. The master cylinder according to claim 6, wherein the pressure regulating channel is formed in the cylinder body.

9. The master cylinder according to claim 8, wherein the pressure regulating channel is formed by drilling through the cylinder body, and the opening made by drilling is closed by a covering member.

10. The master cylinder according to claim 6, wherein the pressure regulating channel allows the large hydraulic pressure chamber of the first hydraulic pressure chamber and the second hydraulic pressure chamber to communicate with each other therethrough.

* * * * *